J. COFFITS.
GATE.
No. 186,662. Patented Jan. 30, 1877.
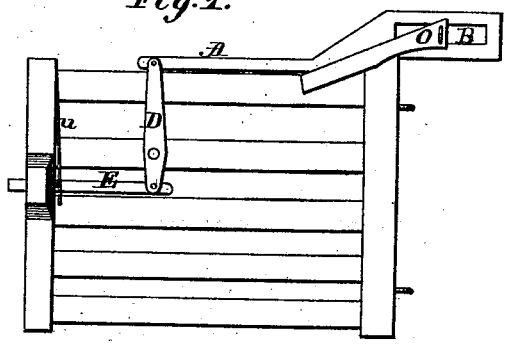
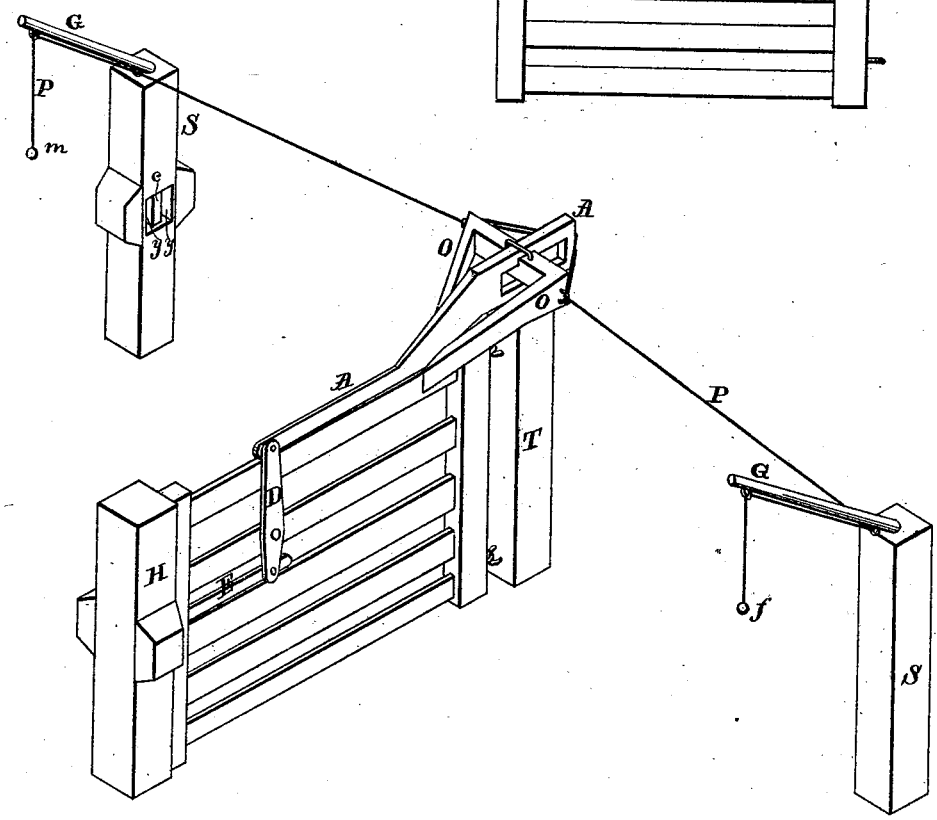
Witnesses:
J. A. Smith.
A. J. McKean.
Inventor:
John Coffits

UNITED STATES PATENT OFFICE.

JOHN COFFITS, OF CENTRAL CITY, IOWA.

IMPROVEMENT IN GATES.

Specification forming part of Letters Patent No. 186,662, dated January 30, 1877; application filed September 22, 1876.

*To all whom it may concern:*

Be it known that I, JOHN COFFITS, of Central City, in the county of Linn and State of Iowa, have invented a new and useful Improvement in Farm-Gates, which improvement is fully set forth in the following specification, reference being had to the accompanying drawings.

The object of my invention is to conveniently and rapidly unbar and swing on its hinges, in a reversible manner, a gate by means of ropes or their equivalent, without alighting from a vehicle or horse, and which can be again closed and barred in the same manner, by the combination in a gate of a slide, A, with a bar, E, connected by a lever, D, and operated by ropes P P, or their equivalent, adjusted to arms O O, as shown in the perspective view, Figure 1, of the accompanying drawing.

The gate is illustrated more in detail in the side view, Fig. 2. The ropes are attached to the arms O O in a transverse manner, across the end of sliding bar A, supported by posts S S, and extended within convenient reach by means of arms G G, in an obtuse angle, and is made to open by the pressure of the ropes at the end of bar A, by pulling the rope at $f$, and closed again by pulling the rope at $m$, and vice versa. The gate is swung to a post, T, set in the ground, and barred by means of a double slot to a post, H, and secured by a spring, $u$; and for the greater safety in case of wind or storm when the gate is open, it is barred to posts S S in like manner as at post H.

As the operator drives up to the gate he halts opposite the post on the side he approaches, and, with a steady pull at the rope, the gate opens, and the bar is thrown into the slot in the opposite post. Advancing on and through the gate to the next post, another halt is made, and, with another pull at the rope, the gate is again closed.

By means of the rope the bar is drawn out of the slot, and at the same time the gate is swung around, and, by the same process repeated at the opposite side, the gate is again adjusted in its proper place, all without the loss of time or the trouble of alighting from a horse or any vehicle. There is a double slot, $y$ $y$, with a partial embrasure, $c$, between, so as to prevent the bar from passing by and beyond, the partial embrasure being only about one-third the depth of the slots in which the bar is stayed.

It will be evident that the invention may be applied to any large or farm gate by adding the arms, slide-bar, and slots, together with the ropes or chain.

I claim as my invention—

The combination, in a gate, substantially as described, of a slide-bar, A, spring-bolt $u$ E, pivoted lever D, and slot, with ropes P, for opening and closing.

JOHN COFFITS.

Witnesses:
J. A. SMITH,
ELI BRUNER,
WILSON JEWETT.